Patented Nov. 13, 1951

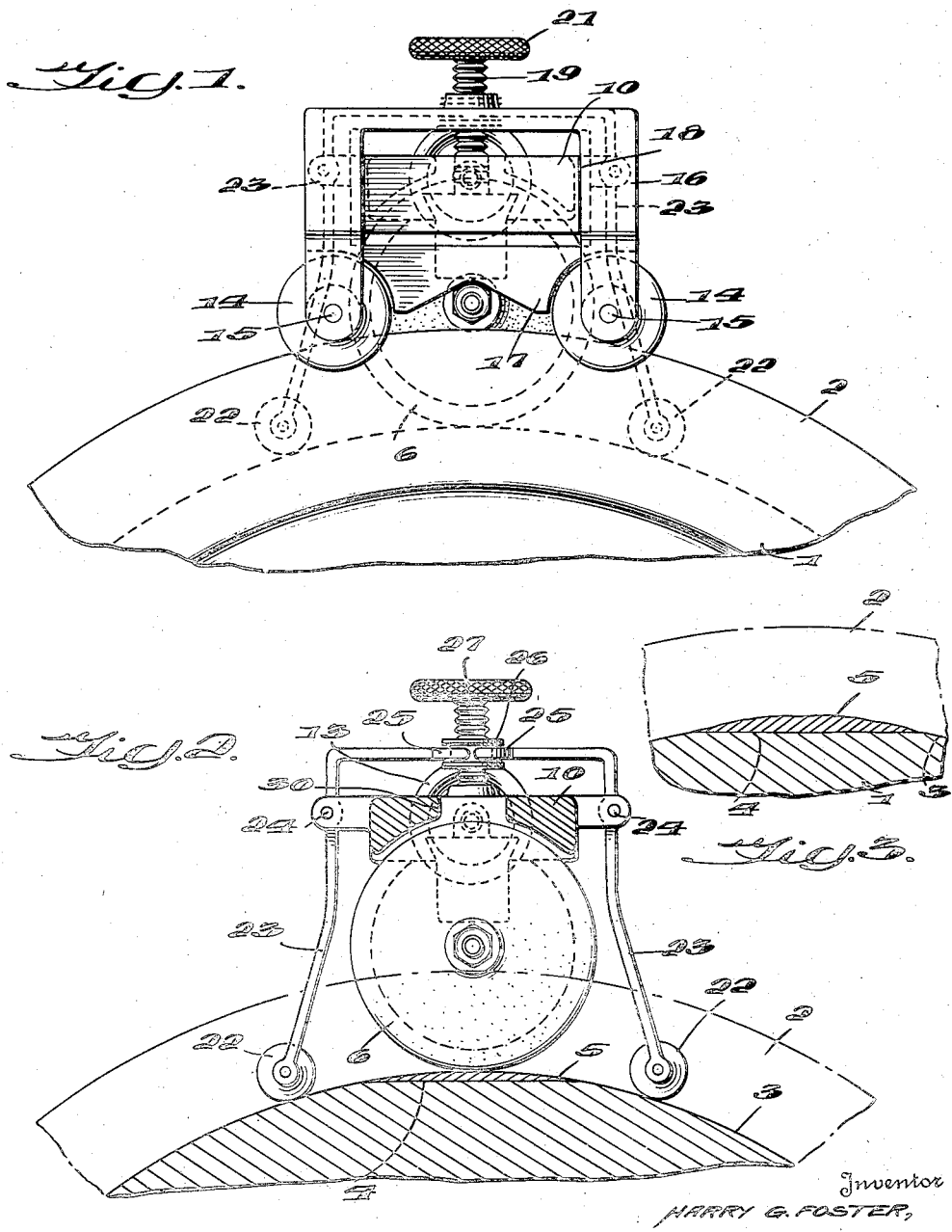

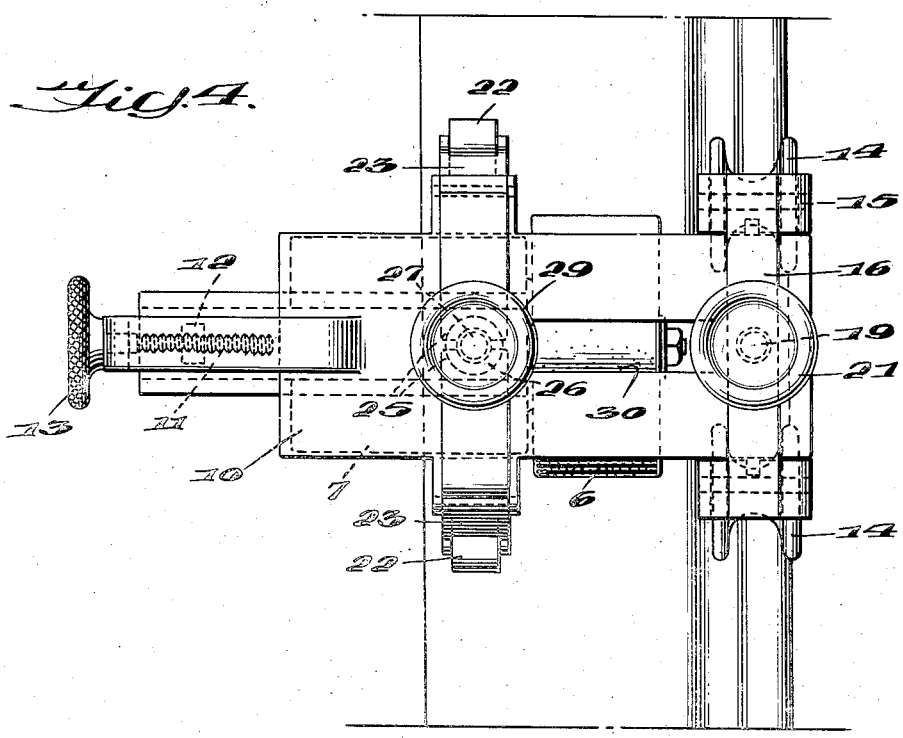
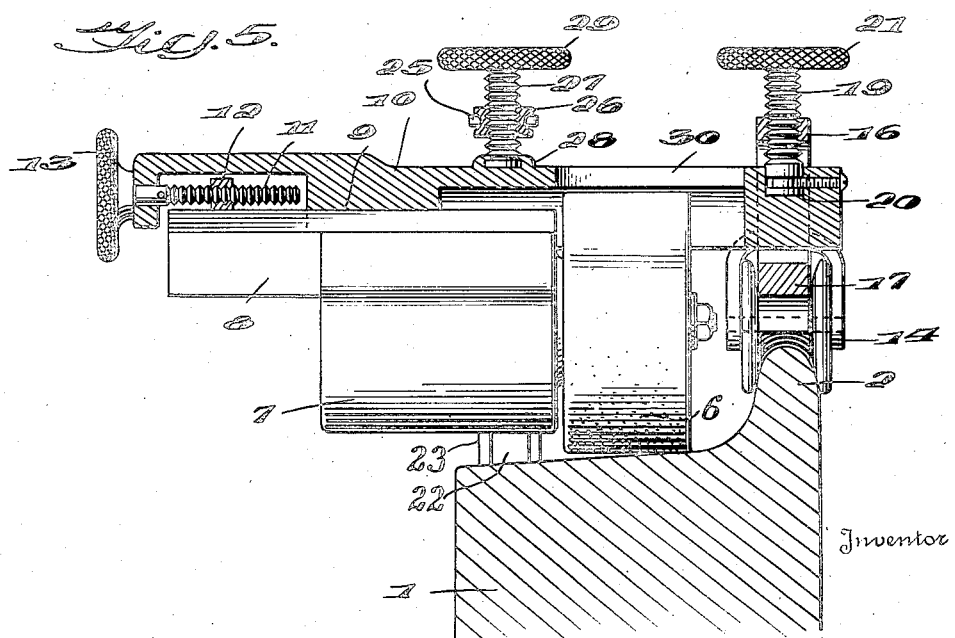

2,575,212

UNITED STATES PATENT OFFICE 2,575,212

WHEEL GRINDER

Harry G. Foster, Mullens, W. Va.

Application July 2, 1948, Serial No. 36,630

7 Claims. (Cl. 51—179)

1

This invention relates to improvements in wheel grinders, especially adapted for the resurfacing of locomotive wheels at the periphery thereof.

In the operation of a locomotive, it happens frequently that the wheels are locked by the brakes in bringing the locomotive to a stop which causes the wheels to slide on the track without rotation. This results in a flat place on the tire due to the wearing down of the circular periphery, which is objectionable because of the thumping action that results from the operation of the engine. It has been the practice heretofore to weld metal onto this portion of the tire to build it up somewhat higher than the normal periphery of the wheel, and then to grind it off by a hand grinder. However, no satisfactory grinder has been provided heretofore for the purpose that will insure of accurate resurfacing of the periphery of the wheel.

The object of this invention is to improve grinders for this purpose, to enable these to be manufactured reasonably inexpensively, and to insure of their accurate operation in the resurfacing of the wheel to restore the desired contour to the periphery thereof.

This object may be accomplished according to one embodiment of the invention by utilizing a power-operated grinding wheel mounted on a supporting frame for bodily adjustment transversely relative thereto, and supporting and guiding the grinder in a circumferential direction on the wheel, both on the flange and on the tire adjacent the built-up periphery. Provision is made for adjustment of the parts not only to accommodate wheels of different sizes but also to insure the accurate resurfacing of the wheel to its initial contour.

This embodiment of the invention is illustrated in the accompanying drawings in which:

Fig. 1 is an end elevation of the grinder shown applied to a car wheel;

Fig. 2 is a cross section therethrough;

Fig. 3 is a similar sectional view through the tire of the wheel showing the built-up metal in the flat portion thereof;

Fig. 4 is a top plan view of the grinder; and

Fig. 5 is a longitudinal sectional view therethrough.

The invention is shown applied to a locomotive driver wheel generally designated by the numeral 1, although it is evident that it may be applied to or used on any car wheel where its function may be desirable. The wheel 1 has the usual flange 2, on the inner side thereof and

2 has a peripheral tire designated generally at 3, which forms the periphery of the tread of the wheel. When the wheel is locked by the brakes during movement of the locomotive or car, a flat place 4 is worn on the tread or tire 3, as indicated in Figs. 2 and 3, which flat place is filled with metal generally designated at 5, as by welding in the manner well understood in the art. This welded metal must be smoothed off to restore the initial contour to the tire 3.

The grinder adapted for this purpose, according to the embodiment of the invention illustrated includes a grinding wheel 6, such as an abrasive or emery wheel of the kind well-known in the art, connected with a power motor 7. The motor 7 may be of the character adapted to utilize whatever available source of power there may be, such as an electric motor, air motor, etc. It is shown as connected directly with the grinding wheel 6, and should be constructed to operate the wheel at the desired speed.

The grinding wheel 6 and motor 7 are shown as supported by a slide bar 8. The slide bar 8 is mounted in a guideway 9 on the under surface of a supporting frame 10 that is elongated and adapted to extend transversely over the wheel. Provision is made for adjusting the slide bar 8 lengthwise of the frame in the guideway 9. In the form illustrated, this adjustment may be made by a screw 11 in threaded engagement with a lug 12, attached to the slide bar 8. The screw 11 extends lengthwise of the frame 10 and is fixed with respect thereto, so that upon rotation of the screw, the slide bar 8 will be moved back or forth in the guideway 9. A hand wheel 13 on the outer end of the screw 11 is adapted for turning the screw to adjust the position of the grinding wheel 6 with respect to the tire 3 of the car wheel.

At the opposite end of the frame 10, provision is made for guiding the movement of the grinder circumferentially of the car wheel. In the form shown in Figs. 1 and 5, this guiding action is accomplished by a pair of V-wheels 14, in position to ride upon the periphery of the wheel flange 2, spaced on opposite sides of the axis of the grinder wheel 6, as shown in Fig. 1. The V-wheels 14 are journaled at 15 in the lower ends of a sub-frame 16, which sub-frame 16 is substantially of U-shape with the wheels 14 at the lower ends of the arms thereof, and braced by a bar 17, extending between said arms.

It is desirable to adjust the V-wheels 14 vertically relative to the axis of the grinder wheel 6, not only to accommodate car or locomotive wheels of different diameters, but also to insure of accurate grinding or resurfacing to the desired contour of the wheel. Consequently, the frames 10 and 16 have interfitted relation with vertical guides 18 along the inner sides of the arms of the U-shaped sub-frame 16, which guide the sub-frame vertically relative to the main frame 10. These parts may be adjusted relatively and secured in adjusted positions with respect to each other by an adjusting screw 19, shown as threaded through the base of the sub-frame 16 and having journaled connection at its inner end at 20 with the main frame 10. A hand wheel 21 on the outer end of the screw 19 may be used to rotate the latter with respect to the frame 16. Upon turning movement of the screw 19, the sub-frame 16 will be moved vertically relative to the main frame 10, to raise or lower the V-wheels 14 with respect to the axis of the grinding wheel 6.

Provision is made also for guiding the grinding wheel 6 in accurate surfacing relation with the periphery of the tire 3 that forms the tread of the wheel. Such guiding relation is maintained by a pair of rollers 22, as shown in Fig. 2, which ride on the periphery of the tire on opposite sides of the built-up metal 4, welded in the flat of the wheel. The positions of the rollers 22 should be adjusted also to accommodate wheels of different diameters of the built-up metal to the initial contour of the wheel. Accordingly, these rollers 22 are adjustably mounted with respect to the grinding wheel 6.

In the form illustrated, this adjustable mounting includes levers 23, having the rollers 22 journaled in the lower ends thereof. The levers 23 are pivotally mounted at 24, intermediate their ends, on opposite sides of the main frame 10. The upper ends of the levers 23 are shown in the form of yokes 25, having journaled embracing relation with a nut 26. The nut 26 is threaded upon a screw 27, extending vertically from the main frame 10, but anchored at its lower end to said frame by a journaled connection 28 therewith. The upper end of the screw 27 is provided with a hand wheel 29 for rotating the screw.

It will be evident that upon turning movement of the screw 27, the nut 26 will be fed vertically relative thereto to raise or lower the upper ends of the levers 23. This will cause an opposite movement of the lower ends of the levers, swinging the rollers 22 in or out with respect to the tread 3 of the wheel, thereby varying the positions of the rollers with respect to the wheel, and consequently varying the supported position of the frame 10, relative thereto. Since the grinding wheel 6 is mounted on the frame 10, this grinding wheel may be adjusted to the proper position with respect to the welded metal on the flat of the wheel by adjusting the positions of the rollers 22, to insure of an accurate resurfacing of the periphery of the wheel to the initial contour thereof.

In using the grinder to resurface the wheel by grinding away the built-up metal 5 in the flat of the wheel, the V-wheels 14 and rollers 22 should be adjusted according to the diameter of the wheel being treated and to locate the periphery of the grinding wheel 6, in abrasive relation with the outer portion of the built-up metal in the flat 4. Then, the operator merely moves the grinder back and forth in a circumferential direction over the built-up metal, while the grinding wheel 6 is operated by the motor 7, gradually changing the positions of the rollers 22 from time to time to lower the grinding wheel 6, as the excess metal 6 is ground away, until the initial contour of the wheel is restored. This may be done very quickly and accurately since the major portion of the weight of the machine is supported by the wheels 14 and rollers 22. The progress of the work can be observed by the operator through an opening 30, in the frame 10.

The grinding wheel 6 may be adjusted axially relative to the frame 10 to resurface substantially the entire width of the tread of the wheel or any point in the tread while the V-wheels 14 are guided on the flange 2 of the wheel. This adjustment is accomplished by the screw 11, which moves the slide bar 8, and the motor and the grinding wheels supported thereby, axially relative to the frame 10, as will be evident from Fig. 5.

While the invention has been illustrated and described in one embodiment, it is recognized that variations and changes may be made therein, without departing from the invention except as specified in the claims.

I claim:

1. A grinder for a car wheel having a flange thereon, comprising an elongated supporting frame, a combined motor and grinding wheel unit, a slide bar secured to the motor and grinding wheel unit and extending lengthwise of the axis thereof, an adjusting screw extending lengthwise of the supporting frame and parallel with the axis of the motor and grinding wheel unit, means forming a threaded connection between the adjusting screw and the motor unit for moving the grinding wheel transversely of the car wheel face, a sub-frame mounted on the supporting frame and bodily slidably mounted thereon for vertical movement relative thereto, means for securing the sub-frame in different adjusted positions relative to the supporting frame, and grooved rollers journaled on the sub-frame in position for guiding relation with the wheel flange.

2. A grinder for a car wheel having a flange thereon, comprising an elongated supporting frame, a combined motor and grinding wheel unit, a slide bar secured to the motor and grinding wheel unit and extending lengthwise of the axis thereof, an adjusting screw extending lengthwise of the supporting frame and parallel with the axis of the motor and grinding wheel unit, means forming a threaded connection between the adjusting screw and the motor unit for moving the grinding wheel transversely of the car wheel face, levers extending upwardly on opposite sides of the supporting frame, means pivotally mounting each of the levers intermediate the ends thereof on the supporting frame, a roller journaled on the lower end of each lever in position to ride upon the periphery of the car wheel, and means operatively connected with the opposite end of each lever for adjusting the roller laterally relative to the grinding wheel.

3. A grinder for a car wheel having a tread surface and a flange thereon, comprising a frame having a power driven grinding wheel depending therefrom, means pivotally connected to said frame to support said frame and grinding wheel on the tread of said car wheel, selectively adjustable means on said frame coacting with said last named means to swing said last named means through arcs in a plane perpendicular to the axis of said grinding wheel whereby said grinding wheel may be moved toward or away from said tread, and guide means mounted on said frame and adapted to engage said flange whereby said frame and said grinding wheel are guided as the grinding wheel is moved relative to the circumference of said car wheel tread.

4. A grinder for a car wheel having a tread surface and a flange thereon, comprising a frame having a power driven grinding wheel depending therefrom, adjustable means for moving said grinding wheel laterally across said tread surface, means pivotally connected to said frame to support said frame and grinding wheel on the tread surface of said car wheel, selectively adjustable means on said frame coacting with said last named means to swing said last named means through arcs in a plane perpendicular to the axis of said grinding wheel whereby said grinding wheel may be moved toward or away from said tread, and guide means mounted on said frame and adapted to engage said flange whereby said frame and said grinding wheel are guided as the grinding wheel is moved relative to the circumference of said car wheel tread.

5. A grinder for a car wheel having a flange thereon, comprising an elongated supporting frame, a combined motor and grinding wheel unit, a slide bar secured to the motor and grinding wheel unit and extending lengthwise of the axis thereof, an adjusting screw extending lengthwise of the supporting frame and parallel with the axis of the motor and grinding wheel unit, means forming a threaded connection between the adjusting screw and the motor unit for moving the grinding wheel transversely of the car wheel face, levers extending upwardly on opposite sides of the supporting frame, means pivotally mounting each of the levers intermediate the ends thereof on the supporting frame, a roller journaled on the lower end of each lever in position to ride upon the periphery of the car wheel, means operatively connected with the opposite end of each lever for adjusting the roller laterally relative to the grinding wheel, a sub-frame mounted on the supporting frame and bodily slidably mounted thereon for vertical movement relative thereto, means for securing the sub-frame in different adjusted positions relative to the supporting frame, and grooved rollers journaled on the sub-frame in position for guiding relation with the wheel flange.

6. A grinder for a car wheel having a tread surface and a flange thereon, comprising a frame having a power driven grinding wheel depending therefrom, levers extending upwardly on opposite sides of the frame, means pivotally mounting each of the levers intermediate the ends thereof on said frame, a roller journaled on the lower end of each lever in position to ride upon the periphery of the car wheel, means operatively connected with the opposite end of each lever for adjusting the rollers laterally relative to the grinding wheel, and guide means mounted on said frame adapted to engage said flange whereby said flange and said grinding wheel are guided as the grinding wheel is moved relative to the circumference of said car wheel tread.

7. A grinder for a car wheel having a tread surface and a flange thereon, comprising a frame having a power driven grinding wheel depending therefrom, means pivotally connected to said frame to support said frame and grinding wheel on the tread surface of said car wheel, selectively adjustable means on said frame coacting with said last named means to swing said last named means through arcs in a plane perpendicular to the axis of said grinding wheel, whereby said grinding wheel may be moved toward or away from said tread surface, a sub-frame mounted on said first named frame and bodily slidably mounted thereon for vertical movement relative thereto, means for securing the sub-frame in different adjusted positions relative to the supporting frame, and grooved rollers journaled on the sub-frame in position for guiding relation with the wheel flange.

HARRY G. FOSTER.

REFERENCES CITED

The following references are of record in the file of this patent:

UNITED STATES PATENTS

| Number | Name | Date |
|---|---|---|
| 596,336 | Norton | Dec. 28, 1897 |
| 851,702 | Spietschka | Apr. 30, 1907 |
| 1,050,915 | Brawley | Jan. 21, 1913 |
| 1,551,167 | Orlow | Aug. 25, 1925 |
| 1,627,074 | Blair et al. | May 3, 1927 |
| 1,633,885 | Castillo | June 28, 1927 |
| 1,891,173 | Perrazoli | Dec. 13, 1932 |
| 1,988,138 | Peck | Jan. 15, 1935 |
| 2,507,052 | Robinson | May 9, 1950 |
| 2,534,969 | Hauser | Dec. 19, 1950 |

FOREIGN PATENTS

| Number | Country | Date |
|---|---|---|
| 27,325 | Great Britain | Dec. 15, 1904 |